United States Patent
Nallatamby et al.

(10) Patent No.: US 12,150,192 B2
(45) Date of Patent: Nov. 19, 2024

(54) METHOD AND SYSTEM FOR ROUTING AUDIO DATA IN A BLUETOOTH NETWORK

(71) Applicant: Google LLC, Mountain View, CA (US)

(72) Inventors: Vincent Nallatamby, Paris (FR); Thomas Girardier, Bourg la Reine (FR)

(73) Assignee: Google LLC, Mountain View, CA (US)

( * ) Notice: Subject to any disclaimer, the term of this patent is extended or adjusted under 35 U.S.C. 154(b) by 312 days.

(21) Appl. No.: 17/609,889

(22) PCT Filed: Jun. 19, 2020

(86) PCT No.: PCT/EP2020/067059
§ 371 (c)(1),
(2) Date: Nov. 9, 2021

(87) PCT Pub. No.: WO2020/254549
PCT Pub. Date: Dec. 24, 2020

(65) Prior Publication Data
US 2022/0210853 A1   Jun. 30, 2022

(30) Foreign Application Priority Data
Jun. 19, 2019  (EP) ................................... 19305788

(51) Int. Cl.
*H04W 76/15* (2018.01)
*H04W 4/80* (2018.01)

(52) U.S. Cl.
CPC ............. *H04W 76/15* (2018.02); *H04W 4/80* (2018.02)

(58) Field of Classification Search
CPC ................. H04W 76/15; H04W 4/80
(Continued)

(56) References Cited

U.S. PATENT DOCUMENTS

| | | | |
|---|---|---|---|
| 2002/0159406 A1* | 10/2002 | Fukuda | H04L 67/30 370/328 |
| 2003/0065806 A1* | 4/2003 | Thomason | H04N 5/775 386/E5.07 |

(Continued)

FOREIGN PATENT DOCUMENTS

| | | |
|---|---|---|
| CN | 1925350 A | 3/2007 |
| CN | 101110614 A | 1/2008 |

(Continued)

OTHER PUBLICATIONS

Extended European Search Report for European Patent Application No. 19305788.2 dated Nov. 5, 2019. 7 pages.

(Continued)

*Primary Examiner* — Mark G. Pannell
(74) *Attorney, Agent, or Firm* — Kilpatrick Townsend & Stockton LLP (57) ABSTRACT

The invention relates to a method for managing a routing of audio data, the method being performed by an audio data routing device (M), the method comprising the steps of: —transmitting (100), in a Bluetooth network, a list of audio transmitting devices (SPK1, SPK2, SPK3), —receiving (200) a communication request (RQ1, RQ2) from a Bluetooth enabled device (S1, S2), —in response to said communication request, establishing (300) a communication link with the Bluetooth enabled device, —managing (400) the audio data routing between the Bluetooth enabled device and a selected audio data transmitting device from the list of audio data transmitting devices.

14 Claims, 6 Drawing Sheets

(58) Field of Classification Search
USPC .......................................................... 370/310
See application file for complete search history.

(56) References Cited

U.S. PATENT DOCUMENTS

| | | | | |
|---|---|---|---|---|
| 2004/0142661 | A1* | 7/2004 | Lane .................... | H04L 12/189 |
| | | | | 455/41.2 |
| 2004/0157559 | A1* | 8/2004 | Sugikawa ............ | H04W 12/08 |
| | | | | 455/41.2 |
| 2006/0154698 | A1* | 7/2006 | Ogura ................ | H04M 1/6091 |
| | | | | 455/569.1 |
| 2007/0015537 | A1* | 1/2007 | DeBiasio ............ | H04M 1/6091 |
| | | | | 455/556.1 |
| 2008/0076483 | A1* | 3/2008 | Shim .................. | H04M 1/6091 |
| | | | | 455/569.2 |
| 2009/0005891 | A1 | 1/2009 | Batson et al. | |
| 2010/0167821 | A1* | 7/2010 | Tamura ............... | H04M 1/6066 |
| | | | | 463/42 |
| 2014/0140674 | A1 | 5/2014 | Jallad et al. | |
| 2014/0195587 | A1* | 7/2014 | Sukoff .................... | H04L 67/01 |
| | | | | 709/203 |
| 2015/0271673 | A1 | 9/2015 | Lord et al. | |
| 2016/0073197 | A1* | 3/2016 | Hammer ............... | H04W 12/50 |
| | | | | 381/80 |
| 2016/0227319 | A1 | 8/2016 | Zhao et al. | |
| 2016/0227351 | A1 | 8/2016 | Gu et al. | |
| 2016/0374133 | A1* | 12/2016 | Logue .................. | H04W 76/14 |
| 2017/0075647 | A1 | 3/2017 | Mei | |
| 2017/0099567 | A1 | 4/2017 | Kwon et al. | |
| 2017/0104880 | A1 | 4/2017 | Shibao | |
| 2017/0272270 | A1* | 9/2017 | Gu ........................ | H04B 17/318 |
| 2017/0280276 | A1* | 9/2017 | Inoue ..................... | H04W 4/80 |
| 2017/0286028 | A1* | 10/2017 | Yang .................... | G06F 3/1285 |
| 2017/0290071 | A1* | 10/2017 | Ito .......................... | H04W 76/14 |
| 2018/0116003 | A1 | 4/2018 | Gu et al. | |
| 2020/0296198 | A1* | 9/2020 | Sasaki ................ | H04M 1/6091 |
| 2021/0127262 | A1* | 4/2021 | Park ..................... | H04W 12/50 |

FOREIGN PATENT DOCUMENTS

| | | |
|---|---|---|
| CN | 101246417 A | 8/2008 |
| CN | 103812537 A | 5/2014 |
| CN | 105023593 A | 11/2015 |
| CN | 105323707 A | 2/2016 |
| CN | 105846865 A | 8/2016 |
| CN | 106685486 A | 5/2017 |
| CN | 107409273 A | 11/2017 |
| CN | 107708099 A | 2/2018 |
| CN | 108966197 A | 12/2018 |
| CN | 109451346 A | 3/2019 |
| EP | 3 101 910 A1 | 12/2016 |
| EP | 3 319 331 A1 | 5/2018 |
| EP | 3 474 577 A1 | 4/2019 |
| WO | 2016/182404 A1 | 11/2016 |
| WO | 2016175575 A1 | 11/2016 |
| WO | 2018/124852 A1 | 7/2018 |
| WO | 2020037810 A1 | 2/2020 |

OTHER PUBLICATIONS

International Search Report and Written Opinion for International Application No. PCT/EP2020/067059 dated Aug. 14, 2020. 12 pages.
International Preliminary Report on Patentability for International Application No. PCT/EP2020/067059 dated Dec. 30, 2021. 9 pages.
Air Max Wireless Network Principles, Technologies, Publication Date: Jul. 31, 2014, Publisher: Weibing Luo, Xidian University Press, p. 150.
Internet of Things Security Practice, Publication Date: Jul. 31, 2017, Publisher: Min Lei, Beijing University of Posts and Telecommunications Press, p. 73.
Principles and Applications of Bluetooth Low Energy Technology, Publication Date: Sep. 30, 2013, Publisher: Canfeng Chen, Beihang University Press, p. 113.
Zeadally, et al., "Design, implementation, and evaluation of the audio/video distribution transport protocol (AVDTP) for high quality audio support over Bluetooth," Computer Communications 28 (2005) 215-223.

* cited by examiner

METHOD AND SYSTEM FOR ROUTING AUDIO DATA IN A BLUETOOTH NETWORK

CROSS-REFERENCE TO RELATED APPLICATIONS

This application is a national phase entry under 35 U.S.C. § 371 of International Application No. PCT/EP2020/067059 filed Jun. 19, 2020, which claims priority from European Patent Application No. 19305788.2 filed Jun. 19, 2019, all of which are hereby incorporated herein by reference.

TECHNICAL FIELD

The present disclosure relates to the field of data routing. Specifically, the present disclosure relates to a method and to a system for managing a routing of audio data to audio transmitting devices using a Bluetooth network (Bluetooth is a registered trademark of Bluetooth SIG, Inc.).

BACKGROUND ART

Methods and devices relying on Bluetooth technology are well-known in the background art. Bluetooth defines a wireless communication standard for sending data using short-wavelength radio waves between different devices. Specifically, Bluetooth enables data exchange over short distances, which can range up to a few tens of meters.

It is known in the background art how to connect a multimedia device, like a computer, a smartphone or a touchpad, to a wireless or wired device to play a given multimedia content. Examples include speakers for playing music at home, hands free units for carrying out a conversation by a smartphone, etc. Bluetooth devices are very popular among customers due to their portability, and in particular, for short-range use like in a home or in a vehicle.

Version 4.0 of Bluetooth, which has been released in 2010, comprises Classic Bluetooth, Bluetooth high speed and Bluetooth Low Energy (BLE) protocols. BLE protocols, which are aimed at very low power applications, provide considerably reduced power consumption and cost while maintaining a similar communication range, thus lengthening the battery life of Bluetooth devices.

Moreover, version 5.1 of Bluetooth, which has been released in 2019, provides improved positioning capabilities that allow Bluetooth devices determining direction and location of a given device up to centimeter accuracy. These capabilities raise new interest in using Bluetooth technology for directional sound applications, such as using a plurality of audio devices to spread sound or music over a broader area than allowed by known speakers.

There is currently a need to develop methods and devices adapted to better focus sound in a specific area, and for instance, to allow different users having a personalized sound experience depending on their location. Instead of having several speakers outputting the same sound for users nearby, it would be more efficient to have directional speakers allowing specific users to listen to a selected audio output.

However, the Bluetooth specifications currently do not enable a many-to-one simultaneous communication, that is, streaming a multimedia content from multiple devices such as smartphones, to a given destination device, like a wireless or a wired multimedia transmitting device such as a speaker.

A limitation imposed by the Bluetooth standard is that when a stream is established between two Streaming Endpoints, hereafter called SEPs, these two SEPs must be locked to each other in order to deliver the stream. However, specific routing capabilities required to stream data using two or more SEPs are not described by the known Bluetooth standard.

This raises several issues for designing Bluetooth systems wherein multiple devices are to be used for directional sound applications. In particular, multiple speakers require multiple source devices. Currently, no existing technology allows having more than a "one at a time" Bluetooth communication, namely, enabling a many-to-one simultaneous communication.

Moreover, there is a need for improved communication types in the framework of directional sound applications, for instance when using multiple directional speakers to emit audio data received from multiple audio sources using a Bluetooth network. Such improved communication types would be useful for allowing several users to have personalized sound experience in a vehicle, such as multiple passengers in a car equipped with multiple directional speakers.

SUMMARY

To address at least some of the aforementioned issues, a first object of the disclosure relates to a method for managing a routing of audio data, the method being performed by an audio data routing device, the method comprising:
  transmitting in a Bluetooth network a list of audio transmitting devices,
  receiving a communication request from a Bluetooth enabled device,
  in response to said communication request, establishing a communication link with the Bluetooth enabled device,
  managing the audio data routing between the Bluetooth enabled device and a selected audio data transmitting device from the list of available audio data transmitting devices.

This allows routing audio data to selected audio data transmitting device(s) using one or more Bluetooth enabled device(s).

This also allows connecting several audio transmitting devices, such as smartphones, to a centralized system which in turn redirects one or several multimedia streams based on a communication request received by the audio transmitting devices. Such a redirection can be carried out simultaneously or successively, automatically or manually.

Herein, and in general, an audio transmitting device can be either available or unavailable. An audio transmitting device is said to not be available when audio data is already routed to it, and an audio transmitting device is said to be available when no audio data is routed to it.

The method also allows redirecting one or several multimedia streams depending if an audio transmitting device is available or unavailable.

The method also allows taking advantage of the capabilities of the latest Bluetooth standards for streaming multimedia data, and in particular, audio data or voice communication data, as will be described hereafter.

Examples of audio transmitting devices include directional speakers configured to enable a unidirectional communication, directional speakers and associated microphones configured to enable a bidirectional communication.

Examples of Bluetooth enabled devices include source devices configured for streaming data towards multiple destination devices, like a smartphone or a Bluetooth speaker which is only used as a sink.

In one preferred embodiment, the communication request comprises an indication of at least one of said audio transmitting devices In one embodiment, the communication request may comprise an indication of at least one of said audio transmitting devices.

In one preferred embodiment, said communication link is established between the audio routing device and one Bluetooth enabled device, said communication link being in a group comprising: a unidirectional point to point link and a bidirectional point to point link.

Herein, said communication link can be created by different means, including by the audio routing device after receiving a communication request or by the Bluetooth enabled device upon reception of a response to the communication request.

Using the established communication link, this allows having more than one source SEP on a source device, extending the possibilities to establish audio/video Distribution Transport to a given device at a given time.

The established communication link also allows multiple smartphones connected in Bluetooth outputting multimedia data, and in particular audio data, to stream such data to multiple audio transmitting devices, such as directional speakers. Doing so, a stream can be established by a many-to-one simultaneous Bluetooth communication.

In one embodiment, a unidirectional point to point link is in a group comprising: an A2DP link, an ACL link and a BLE link such as a single BLE isochronous channel or link.

In one embodiment, a bidirectional point to point link is in a group comprising: a HFP link, a SCO link, an eSCO link and a BLE link such as a dual BLE isochronous channel or link.

In one embodiment, the method further comprises implementing an extended Bluetooth audio profile that supports multiple simultaneous data links between the audio transmitting devices and the Bluetooth enabled device.

This allows having more than one source SEP on a source device, extending the possibilities to establish audio/video Distribution Transport to a given device at a given time.

In one embodiment, the audio data comprises a Bluetooth signal being in a group comprising: an audio stream signal and a voice communication stream signal.

This allows taking advantage of the capabilities of the latest Bluetooth standards for streaming multimedia data, and in particular, audio data and/or voice communication data, as will be described hereafter.

In one embodiment, the routing of the audio stream from the audio transmitting devices to the output device is carried out by a direct communication link or by an indirect communication path.

This allows streaming data directly (or indirectly) from one or multiple audio transmitting devices to selected audio transmitting devices by establishing a communication link (or path), or streaming data from the audio transmitting devices, the data possibly passing through other devices such as an external server or a telecommunication network like the Internet.

In one embodiment, the step of transmitting a list of audio transmitting devices or the step of receiving a communication request is carried out using a BLE GATT profile.

Herein, a BLE GATT profile is a Bluetooth Low Energy Generic Attribute Profile, which is a profile or protocol allowing two Bluetooth Low Energy devices to transfer data back and forth.

According to a second object of the disclosure, a computer program product is disclosed, said computer program product comprising a computer readable medium having stored thereon computer program instructions loadable into a computing device and adapted to—when loaded into and executed by said computing device—cause the computed device to perform the steps of a method according to any of the aforementioned embodiments.

According to a third object of the disclosure, an audio data routing device for managing the routing of audio data is disclosed, said device being configured to:
  transmit in a Bluetooth network a list of audio transmitting devices,
  receive a communication request from a Bluetooth enabled device,
  in response to said communication request, establish a communication link with the Bluetooth enabled device,
  manage the audio data routing between the Bluetooth enabled device and a selected audio data transmitting device from the list of available audio data transmitting devices.

In one embodiment, the audio data routing device comprises a Bluetooth chip configured to transmit in a Bluetooth network, a list of available audio transmitting devices, to receive a communication request from a Bluetooth enabled device, in response to said communication request, to establish a communication link with the Bluetooth enabled device and/or to manage the audio data routing between the Bluetooth enabled device and a selected audio data transmitting device from the list of available audio data transmitting devices.

According to a fourth object of the disclosure, a vehicle infotainment system for managing the routing of audio data is disclosed, said system comprising:
  an audio data routing device according to the third object of the disclosure,
  audio transmitting devices, and
  a Bluetooth enabled device.

Herein, an infotainment device can be for instance any type of audio data routing device for performing the steps of the method.

This allows outputting audio on multiple destination devices. For instance, this can be used for configuring a Bluetooth multimedia system for vehicle and outputting audio data or voice communication data on directional speakers.

In one embodiment, at least one Bluetooth enabled device is in a group comprising: a smartphone, a Bluetooth speaker, a Bluetooth headset, a computer, a tablet and a video game console.

In one embodiment, at least one audio transmitting device comprises a directional speaker or a microphone.

Advantageously, a directional speaker allows unidirectional communication while a directional speaker combined with a microphone allows a bidirectional communication.

In one embodiment, a directional speaker or a microphone is wired to the audio routing device.

In one embodiment, at least one audio transmitting device comprises a sink which is wirelessly connected to the audio routing device, such as a Bluetooth speaker or a Bluetooth headset. Any type of wireless protocol can be used for said wireless connection.

In one embodiment, at least one audio transmitting device comprises a source which is wirelessly connected to the audio routing device, such as a smartphone or a Bluetooth headset with an integrated microphone. Any type of wireless protocol can be used for said wireless connection.

In one embodiment, at least one audio transmitting device comprises a Bluetooth source device or a Bluetooth audio gateway.

When an audio transmitting device is a Bluetooth source device or a Bluetooth audio gateway, this allows routing one active stream with one of the connected devices and/or one active stream with more than one connected device, or even, multiple active streams with multiple connected devices.

An example of vehicle infotainment system is a car infotainment system, e.g., a master speaker of a sound system in a car which is configured to manage the routing of audio data in general. Such an infotainment system allows outputting audio on multiple destination devices.

In one embodiment, an audio data routing device comprises one or more Bluetooth chips.

Advantageously, an audio data routing device of a car infotainment system comprising a plurality of Bluetooth chips allows increasing the connection bandwidth and therefore, increasing the number of devices to connect.

BRIEF DESCRIPTION OF DRAWINGS

Other features, details and advantages of the objects of the disclosure will be apparent from the following detailed description given by way of non-limiting example, with reference to the accompanying drawings, in which.

DESCRIPTION OF EMBODIMENTS

Figures and the following detailed description contain, essentially, some exact elements. They can be used to enhance understanding the disclosure and, also, to define the invention if necessary.

Figure 1:
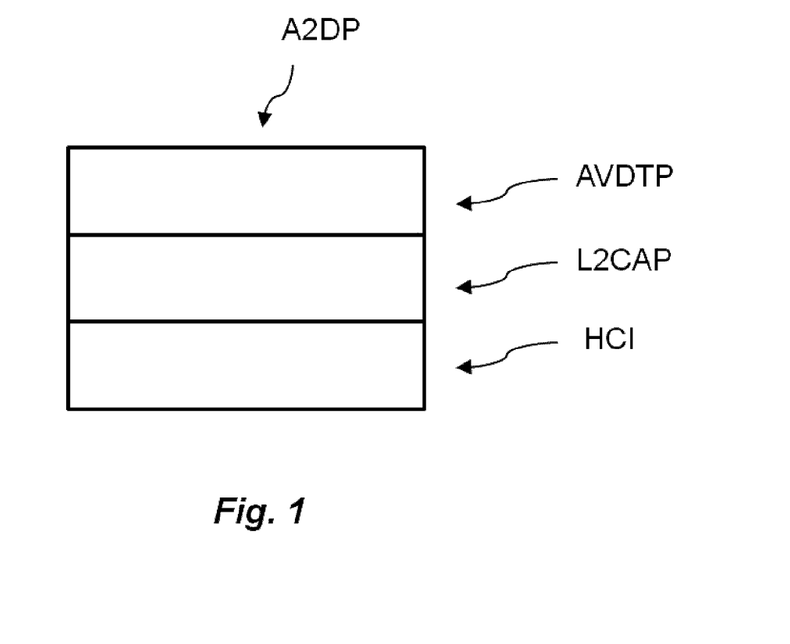
FIG. 1, illustrates an A2DP profile according to embodiments of the disclosure.

FIG. 1 illustrates an A2DP profile arranged for exchanging data using a Bluetooth protocol according to embodiments of the present disclosure.

According to one embodiment, an A2DP profile is based on an Audio/Video Distribution Transport Protocol, AVDTP. An AVDTP defines binary transactions between Bluetooth devices and allows establishing an audio stream and/or a video stream. Specifically, AVDTP relates to the transport of audio and/or video data between two Stream End Points (SEPs). For instance, a conventional A2DP profile defines a set of protocols and procedures for the exchange of audio data via a Bluetooth protocol between a Source (or master) device and a Sink (or slave) device, for example a Bluetooth speaker.

Herein, a SEP may comprise three logical entities: a data source (or sink), a stream adaptor configured for sending and/or receiving frames over a network, and a stream interface control object which provides an interface.

Preferably, each SEP involves a SBC codec for digital audio encoding and decoding, which can be used to transfer data to Bluetooth audio transmitting devices like headphones or loudspeakers. Each SEP may also involve an aptX codec, which is a Bluetooth compression algorithm that provides benefits over the standard SBC codec. Each codec is preferably associated with a different SEP than the one(s) associated with other codec(s), but the same codec can be associated with multiple SEPs.

Typically, an A2DP profile comprises several layers defined by the Bluetooth standard, including:
- a "transaction" layer, corresponding to the reference AVDTP;
- a "link manager" layer, corresponding to the reference L2CAP, which is also an acronym for "Logical Link Control and Adaptation protocol"; and
- a Host Controller Interface, corresponding to the reference "HCl".

Herein, a Host to Controller Interface is an optional standard interface between a controller subsystem and a Bluetooth device (e.g., a computer or a mobile phone). A HCl allows the host or the controller to be swapped with minimal adaptation. In Bluetooth devices having simple functionality (e.g., headsets), the host and the controller can be implemented on a same microprocessor. In such a case the HCl is optional, although often implemented as an internal software interface.

Herein, the AVDTP layer is configured for setting up a stream and for streaming an audio and/or video stream using a L2CAP layer. For instance, an A2DP profile can be used to stream music from a laptop to stereo headsets over an L2CAP channel.

A L2CAP layer defines a minimum protocol for exchanging data between two SEPs, such as two Bluetooth devices. The L2CAP layer can implement various transport protocols via Bluetooth, and enables segmenting data packets, assembling or reassembling data packets, and multiplexing.

Herein, AVDTP and L2CAP layers allow exchanging data using Bluetooth between a master device and a slave device, for instance throughout some channel identifiers of said devices. Specifically, a L2CAP layer can be configured to manage the control of data streams passing through L2CAP-defined layers, using different parameters and functions, such as multiplexing data between different protocols, providing transmission management of multicast data to other Bluetooth devices or defining a maximum latency throughout a "Quality of service" parameter.

Thus, the AVDTP layer allows a negotiation of the stream parameters and can manage the stream itself, would it be for audio or voice communication data.

According to one embodiment, a device for controlling Bluetooth devices is arranged to determine, manually or automatically, from different configurations supported by Bluetooth stacks of to such Bluetooth devices, the configuration to be adopted for each L2CAP channel.

A L2CAP channel allows establishing a logical link between a Bluetooth chip of a device, so as to maintain a synchronized link between the device for managing the plurality of audio transmitting devices. The L2CAP parameters of each of the devices may be different, as they may depend on the features of each device, such as their ability to support certain protocols, etc.

However, a limitation imposed by the known AVDTP protocols according to the current Bluetooth standard is that when a connection is negotiated between two SEPs, these two SEPs must be locked to each other for streaming. By default, a connected SEP refuses new connections. For example, there can be two smartphones connected to a same speaker, but multiple simultaneous transports cannot be set up.

Moreover, according to the Bluetooth standard, switching to a new connection typically occurs by terminating the previous connection while keeping the previously connected smartphone in memory. As a result, if there is only one audio source SEP, then only one AVDTP transport can be established to a given device at a given time. While two smartphones can be connected to a same speaker, multiple transports cannot be set up simultaneously. As a result, according to the current background art, if there is only one source SEP on a source device, then only one AVDTP transport can be established to a given slave device at a given time.

In order to solve the aforementioned issues of the current background art, the embodiments described herein are configured to support an extended Bluetooth profile. Said extended Bluetooth profile, typically a Bluetooth audio profile, can be comprised in an AVDTP layer of an A2DP profile configured to support multiple simultaneous sources. This can be achieved by reproducing the function of a SEP, e.g. by emulating a SEP so as to allow for one or more additional communication links.

As the Bluetooth standard does not allow communication from one source SEP to multiple destination SEPs, the embodiments described in the present disclosure constitute possible extensions of the Bluetooth standard, extensions which are designed not to create new difficulties since the Bluetooth standard is not designed to detect such extensions.

According to one embodiment, several SEPs can be emulated so as to allow for as many possible links as there are Bluetooth slave devices. For instance, four SEPs can be emulated when four multimedia devices are present, which in turn allows establishing several communication links in order to stream data to said multimedia devices.

According to one embodiment, an audio routing device comprises a Bluetooth chip which is configured to implement an A2DP profile which is modified so as to create a point-to-multipoint link from said Bluetooth chip to a plurality of audio transmitting devices, such as speakers. The Bluetooth chip can be programmed to route a plurality of multimedia streams, each stream being intended for a respective audio transmitting device among a plurality of said devices. Herein, these multimedia streams can be related to each other, meaning that the multimedia streams relate to a same situation.

This allows extending existing Bluetooth profiles in order to allow one-to-many communications. It is then possible to send audio data and/or voice communication data from one (or more) audio transmitting device(s) to multiple audio transmitting devices.

According to one embodiment, an audio transmitting device is for example arranged to output an audio stream, and more generally a multimedia stream, via a Bluetooth link. For instance, it stores or relays a multimedia stream which comprises at least one audio channel. Among possible examples, such a device stores MP3 files or connects to a server from which it downloads streams that it progressively and/or simultaneously retransmits via Bluetooth to multiple audio transmitting devices, such as Bluetooth speakers.

According to other embodiments, other profiles can be used to carry out the method described in the present disclosure. For instance, Hands-Free Profile, HFP, and Headset Profile, HSP, are two types of profiles based on existing Bluetooth profiles, which define protocols and procedures for exchanging voice communication data between a source device and a sink device. For instance, an HPF link can be used for a hands-free kit communicating with a mobile phone in the car. An HSP link can provide support for Bluetooth headsets to be used with mobile phones and gaming consoles. Bluetooth headsets can implement both Hands-Free Profile and Headset Profile so as to allow for extra features in HFP, for use with a mobile phone, such as call waiting and voice dialing.

Figure 2:
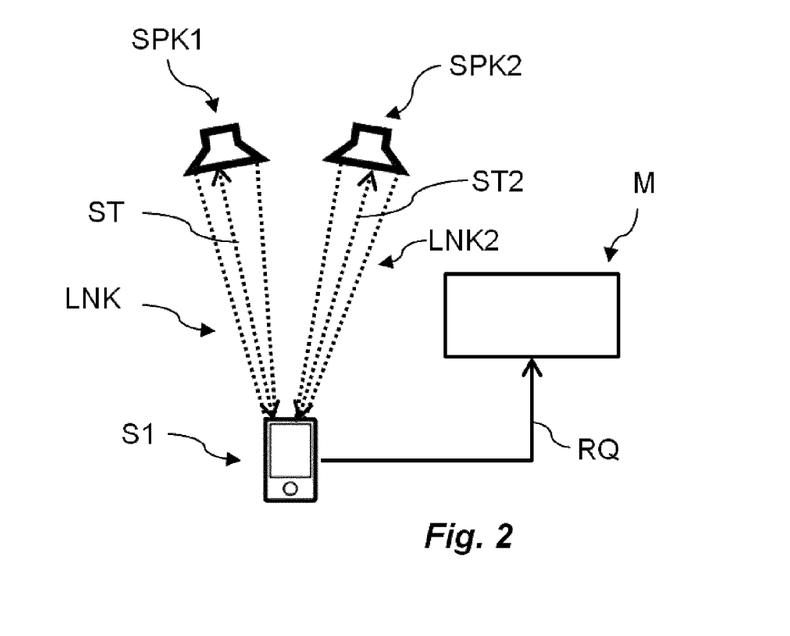
FIG. 2, illustrates a Bluetooth system according to embodiments of the disclosure.

Now, with reference to FIG. 2, a system based on the method described in the present disclosure is shown. The system comprises a smartphone S1, an audio data routing device M and a plurality of audio transmitting devices SPK1 and SPK2. These audio transmitting devices can be wired or wireless speakers.

According to one embodiment, an audio transmitting device can also be a headset, an ear bud, a telephone receiver, etc. Such an audio transmitting device can also be configured to receive voice communication data.

According to one embodiment, an audio transmitting device can be a directional sound speaker configured to broadcast a sound that can only be heard by a user sufficiently close to said speaker.

Herein, a directional sound speaker is a speaker configured so that the broadcasted directional sound is heard by a given user with normal hearing and positioned at a distance of roughly 50 centimeters from the speaker, in the presence of ambient noise corresponding to that of a conversation. For instance, a plurality of directional speakers can be configured to output audio to a given passenger sitting in a car, but such that said audio cannot be heard by the other passengers located behind him/her or next to him/her.

According to one embodiment, an audio transmitting device can be a loudspeaker arranged to broadcast a sound that can be simultaneously heard by several people, so as to design a surround sound system.

As illustrated on FIG. 2, a device S1, such as a Bluetooth enabled device like a smartphone, interacts with an audio data routing device M, for instance a Bluetooth audio data routing device configured for generating communication links, namely a first communication link LNK1 and a second communication link LNK2 between S1 and the speakers SPK1 and SPK2. The first communication link LNK1 can later be used to stream a first stream ST to SPK1, and the second communication link LNK2 can later be used to stream a second stream ST2 to SPK2. Any of these streams can be streamed from S1 directly to SPK1 and/or SPK2, or indirectly through M or any other devices involved.

Figure 3:
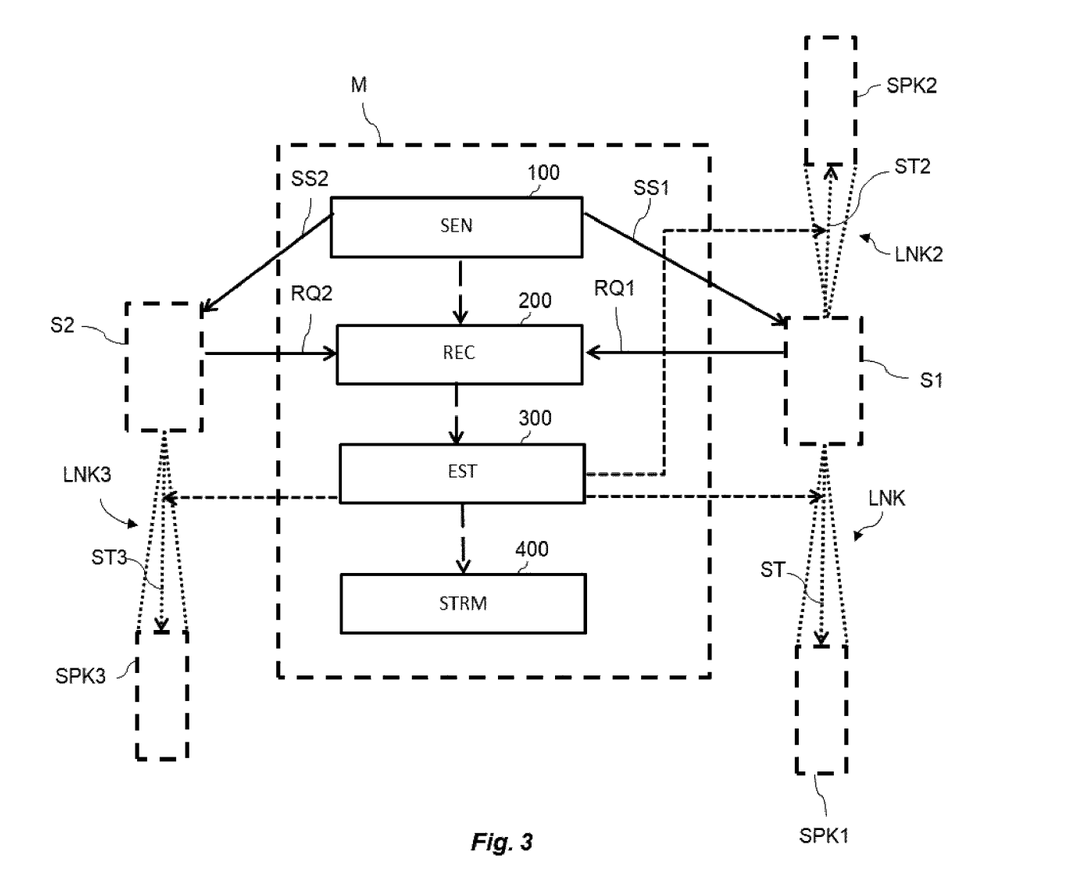
FIG. 3, illustrates a flowchart of a method according to embodiments of the disclosure.

FIG. 3 is a flowchart illustrating the steps of a method according to an embodiment of the disclosure.

Specifically, at a step 100, the audio data routing device M transmits a list of available audio transmitting devices. For instance, and without limiting the generality of the disclosure, available audio transmitting devices are, typically, nearby devices in the range of being accessed by M through a wireless connection. The available audio transmitting devices can also be predetermined devices.

As illustrated on FIG. 3, such available audio transmitting devices comprise at least three different speakers SPK1, SPK2, and SPK3.

According to one embodiment, and without limiting the generality of the disclosure, a list of available audio transmitting devices is transmitted at step 100 from M to Bluetooth enabled devices S1 and S2 through selection signals. For instance, a first selection signal SS1 is transmitted from M to S1 and a second selection signal SS2 is transmitted from M to S2.

Moreover, an audio transmitting device can be an audio output device such as a loudspeaker or a directional speaker, or an audio input device such as a microphone.

For instance, the first selection signal SS1 comprises a list of devices which are either connected to M or in range of the Bluetooth enabled device S1.

For instance, one can consider that the audio transmitting devices are directional speakers or microphones while the Bluetooth enabled devices are smartphones.

This allows the audio data routing device M to route a stream from smartphones S1 and/or S2 to a directional speaker or a microphone.

In alternative embodiments, the audio data routing device M can be configured to allow routing a stream from a microphone, or a speaker, to smartphones.

Without limiting the generality of the disclosure, the list of available audio transmitting devices can simply include predetermined devices, such as wired speakers inside a car. Similarly, M sends to S2 a second selection signal SS2.

In embodiments, an audio stream can be streamed by a wireless connection, e.g. a Bluetooth connection.

In embodiments, one or more audio transmitting devices are connected wirelessly to the audio data routing device M.

In alternative embodiments, one or more audio transmitting devices are connected wirelessly to the Bluetooth enabled device(s).

According to one embodiment, the organization of the list depends on parameters such as the types of the audio transmitting devices, their settings such as their bandwidth or output volume, their distance from S1 and/or their distance from M, etc.

According to one embodiment, the list of available audio transmitting devices can be forwarded to other devices, such as an external server.

Following the transmitting step 100, at a step 200, M receives a communication request from one or multiple Bluetooth enabled devices S1 and S2. Specifically, M receives a first communication request RQ1 from the first Bluetooth enabled device S1 and a second communication request RQ2 from the second first Bluetooth enabled device S2.

According to one embodiment, a communication request defines a reference for comparing the times at which other Bluetooth slave devices connect to M later on. This allows keeping track of the different audio transmitting devices that connected to M.

For instance, the communication request RQ1 sent from S1 to M comprises an indication that the audio transmitting devices SPK1 and SPK2 are available to route an audio stream while the communication request RQ2 sent from S2 to M comprises an indication that the single output device SPK3 is available to route an audio stream.

In one embodiment, the steps 100 and 200 may be carried out interchangeably. Specifically, the step of receiving a communication request from a Bluetooth enabled device may be carried out before the step of transmitting in a Bluetooth network, by an audio data routing device, a list of available audio transmitting devices.

For instance, a smartphone may make a communication request, and then receive a list of available devices to communicate with.

In FIG. 3, and upon reception of RQ1 or RQ2 at step 200, the audio data routing device M is informed that the speakers SPK1, SPK2 and SPK3 are available.

According to one non-represented embodiment, and upon reception of a communication request at step 200, M selects a specific device for receiving a multimedia stream. This selection can be performed automatically, for instance by programming M so that a predetermined audio transmitting device is chosen when a given Bluetooth enabled device connects to M, e.g. by sending a communication request. This selection can also be performed manually, for instance by requesting a user of an audio transmitting device to interact with M through an interface of M and/or of the Bluetooth enabled device.

According to one embodiment, a communication request is a connection request according to the Bluetooth standard.

According to one preferred embodiment, the communication request can be based on a BLE GATT profile, namely, a Bluetooth Low Energy Generic Attribute profile, for carrying out the step of receiving said communication request.

Advantageously, this allows carrying out route discovery when a routing of audio data is being managed.

In particular, when the audio data routing device is in use, said device can expose a GATT service, such as a 16-bit Universally Unique Identifier, or UUID.

Herein, a Bluetooth enabled device scanning for said GATT service can initiate a connection request. When connected to the GATT profile of the routing device, this allows the Bluetooth enabled device to retrieve the list of the audio transmitting devices using a first function of said GATT profile.

In one embodiment, a request to establish an audio communication with the selected destination device using a second function of the GATT profile can be used.

According to one embodiment, at a step 300 following step 200, the audio data routing device M establishes a first communication link LNK between S1 and SPK1.

Establishing a communication link may be carried out in various network topology examples. For instance, said communication link can be established in a non-Bluetooth network, such as a "hub and spokes" topology. Herein, a "hub and spokes" topology is a form of star topology in which all links are point-to-point. The hub can be an audio data routing device. In another example, said first communication link can be established in a Bluetooth-extended network, for instance by establishing a connection between at least one audio data transmitting devices via a ring network to an audio data routing device.

According to one non-represented embodiment, communication links can also be established between S1 and other audio transmitting devices such as SPK2, SPK3, or other external devices such as a server or a telecommunication network like the Internet.

According to one embodiment, at a step 400 following step 300, the audio data routing device M then routes audio streams from the Bluetooth enabled device to the audio transmitting device.

According to one alternative embodiment, at the step 400 following step 300, the audio data routing device M routes audio streams from the audio transmitting device to the Bluetooth enabled device.

As shown on FIG. 3, and without limiting the generality of the disclosure, the streams involve a first stream ST routed from S1 to SPK1, a second stream ST2 routed from S1 to SPK2 and a third stream routed from S2 to SPK3.

In one embodiment, other configurations of routings of audio streams from the Bluetooth enabled devices S1 and S2 are also possible.

In one embodiment, audio streams can be routed by M from a specific Bluetooth enabled device to an external server, and then from said external server to a selected audio transmitting device.

In one alternative embodiment, audio streams can be routed by M from a specific selected audio transmitting device to an external server, and then from said external server to a Bluetooth enabled device.

According to one embodiment, communication links are established with the audio transmitting devices so as to stream audio streams later on. For instance, two separate communication links LNK and LNK2 are established between S1 and the two speakers SPK1 and SPK2, and a third communication link LNK3 is established between S2 and the speaker SPK3. These communication links can then be used for subsequent steps in view of routing audio streams between two devices.

According to one embodiment, the method comprises a localization step for determining a location of a device, and in particular of at least one Bluetooth enabled device.

In embodiments, the step 200, 300 or any other step may comprise a sub-step of determining a location of a device using the Bluetooth 5.1 specification. This allows selecting an audio transmitting device based on one or more determined locations said determined localization.

This allows determining the relative location with respect to M.

For instance, a localization of the Bluetooth enabled device S1 can be determined by performing a triangulation based on indications of the strength of signals emitted by S1.

Other triangulation techniques such as fingerprinting, probabilistic methods, neural networks or the use of sensors such as accelerometers or magnetometers can also be used to localize the position of a multimedia device.

A localization of a device can also be obtained by using the communication request RQ.

Specifically, a localization of a device can be carried out using the specifications of Bluetooth 5.1. This allows enhancing a localization based on direction finding features that make it possible to detect the direction of a Bluetooth signal.

For instance, Bluetooth 5.1 embeds techniques like the Angle of Arrival, AoA, and the Angle of Departure, AoD, which both provide direction finding capabilities.

The AoA technique comprises transmitting a specific direction-finding signal, for instance using one antenna, to a receiver which comprises multiple antennas. The incoming signal is received by the multiple antennas with slight time-shifts relative to each other. The time-shifts in the phase of the signal as received by the multiple antennas are then sampled and analyzed, yielding accurate location information as received.

The AoD technique comprises transmitting a signal from multiple antennas to a receiving device such as a mobile phone, which after sampling and analysis can perform a coordinate calculation to determine accurate location information.

For instance, the Bluetooth chip of the audio routing device is configured to automatically select at least one of the audio transmitting devices to which route a stream according to the location of the Bluetooth enabled device. Therefore the user does not have to manually change audio transmitting devices according to their positions, if any device is moved from its original location.

This also allows allocating a plurality of streams, such an allocation being different depending on the type of device or depending on their relative position with respect to the audio data routing device.

Figure 4:
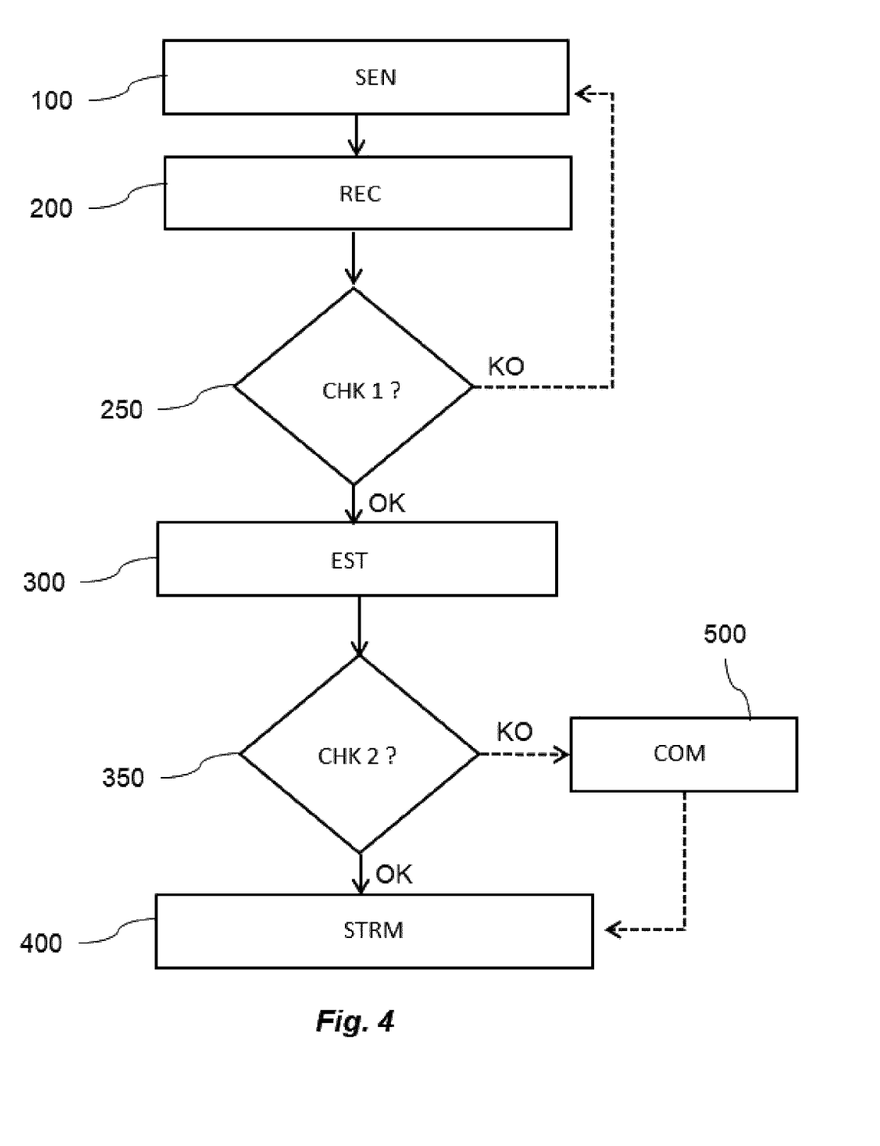
FIG. 4, illustrates a flowchart of a method according to other embodiments of the disclosure.

FIG. 4 is a diagram illustrating further steps of a method according to other embodiments of the disclosure.

According to one embodiment, an intermediary step 250 can be implemented after step 200 and before step 300, said intermediary step 250 comprising a first test. Said first test can be implemented upon reception of an indication of the available audio transmitting devices comprised in a communication request.

For instance, the first test corresponding to step 250 comprises checking if an audio transmitting device accepts or refuses establishing an audio stream with another device.

Specifically, the audio stream can be established using a Bluetooth audio link between the audio routing device and a Bluetooth enabled device, such as a smartphone.

In an alternative embodiment, the audio stream can be established using a wired audio link.

This check may be performed for selecting a specific device, or for streaming an audio stream later on. If accepted, the step 300 is carried out, and if refused, steps 100 and step 200 are carried out once again.

As an example of the intermediary step 250, the user of an audio transmitting device may not be interested to stream content at a given moment. For instance, when receiving a private phone call on his/her smartphone while driving a car, a user might want to delay the moment at which a communication link is established.

According to one embodiment, another intermediary step 350 can be implemented after step 300 and before step 400, said intermediary step 350 comprising a second test.

For instance, the second test corresponding to step 350 comprises checking if a stream and/or a communication link is already established between the audio data routing device and an audio transmitting device. This can allow determining if said audio transmitting device is available or not.

According to one embodiment, if a stream and/or a communication link is already established, the streaming step 400 is carried out; if not, a step 500 comprising a generation of a communication link between the audio data routing device and the audio transmitting device is implemented.

This allows avoiding generating too many communication links if one or more of such links have already been generated.

According to one embodiment, one or more intermediary steps could also be implemented, such as a step for deleting established communication links, a step for redirecting or stopping a stream to a device, etc.

Figure 5:
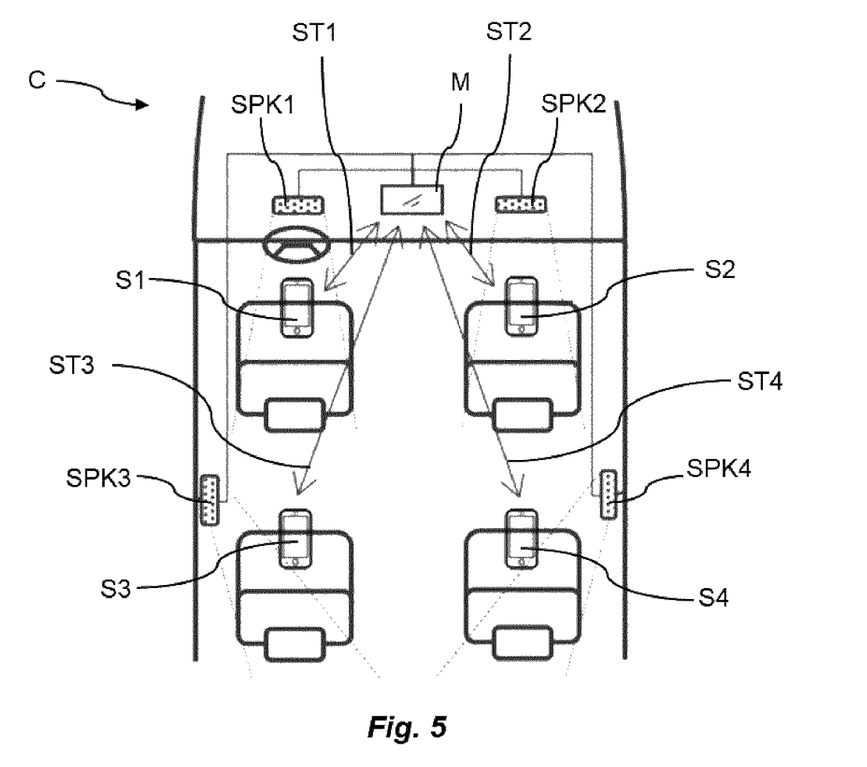
FIG. 5, illustrates a Bluetooth system according to embodiments of the disclosure.

Now with reference to FIG. 5, the managing of a plurality of devices located inside the cockpit C of a vehicle, such as a car, is implemented. In particular, a system comprising multiple Bluetooth devices S1, S2, S3 and S4 is shown.

Here, the Bluetooth slave devices S1, S2, S3 and S4 are smartphones, each smartphone being associated to a passenger of the vehicle and occupying a different seat in the cockpit C. For instance, the first smartphone S1 belongs to the driver of the car and the three other smartphones belong to the passengers sitting either next to the driver or behind the driver.

The system further comprises a Bluetooth audio data routing device M, which is for instance an infotainment device located in the dashboard of the cockpit C. The system also includes a plurality of audio transmitting devices, hereafter called multimedia devices. As represented, said multimedia devices comprise four wired speakers SPK1, SPK2, SPK3 and SPK4 which are connected to M and configured to output audio signals for the passengers of the car.

According to one embodiment, a speaker is an acoustic speaker of a hi-fi system or a mobile phone equipped with a loudspeaker intended to be audible to a plurality of users. While not being speakers per se, a headset, an ear bud, or a telephone receiver is here within the meaning of an audio transmitting device according to the present disclosure.

According to one embodiment, the master device M is an infotainment device such as an In-Car Entertainment system, ICE, or an In-Vehicle Infotainment IVI, including a collection of hardware and software in a vehicle for providing audio or video entertainment. ICE or IVI systems may include car audio systems such as radios, cassette or CD players.

According to one embodiment, the infotainment device includes automotive navigation systems, such as a global positioning system, GPS, device, video players, USB or Bluetooth connectivity, Carputers, in-car internet, and WiFi. The infotainment device may also include a man-machine interface, steering wheel audio controls and/or a hands-free voice control unit.

According to one embodiment, the master device M is an infotainment device which is wired to four directional speakers SPK1, SPK2, SPK3 and SPK4. In further embodiments, said speakers can comprise a sound recorder, such as a microphone.

According to one embodiment, the master device M supports a Bluetooth audio profile, for instance in an AVDTP layer of an A2DP profile which is used to establish an A2DP link between a SEP of the destination device and one of the slave device SEPs.

When the master device M is a Bluetooth device supporting an extended Bluetooth audio profile, said Bluetooth audio profile may also support multiple simultaneous sources. This can be achieved by generating and/or emulating multiple SEPs. When the master device M is in use, it provides one SEP for each of the four speakers SPK1, SPK2, SPK3 and SPK4.

According to one embodiment, the master device M associates to each SEP, and thus to each speaker, a corresponding location. For instance, M associates a SEP labeled "front left" to the speaker SPK1, a SEP labeled as "front right" to the speaker SPK2, a SEP labeled as "back left" to the speaker SPK3 and a SEP labeled as "back right" to the speaker SPK4. When a user is present in the car and occupies a seat, this user can use his/her smartphone for selecting the corresponding SEP. Doing so, the user selects the closest speaker to his/her position among the plurality of multimedia devices in the car. Each of the users can select, wirelessly and with his/her smartphone, a corresponding SEP. Each smartphone then streams an audio content using an established communication link with the master device M, which in turn routes it to a selected corresponding multimedia device(s).

In FIG. 5, the "front-left" directional sound speaker SPK1 emits audio content based on the stream ST1 received by the smartphone S1, the "front-right" directional sound speaker SPK2 emits audio content based on the stream ST2 received by the smartphone S2, and so on.

This allows each user in the cockpit C of the car to receive an audio content corresponding to the stream which is provided by his/her smartphone.

Alternatively, a user can select one or several speakers among SPK1, SPK2, SPK3 and SPK4 for streaming audio content or sharing a voice communication with another user. Microphones comprised among other multimedia devices in the cockpit C could also be selected. For instance, the driver of the car who receives a voice call on his/her smartphone S1 may forward or share a voice communication to any of the passengers of the car so that said passengers may participate in the conversation, or only some of them.

This allows each user in the cockpit C of the car to receive an audio content, or a voice communication According to one embodiment, the managing of a plurality of multimedia devices can be used for establishing a voice communication link.

As illustrated on FIGS. 3, 4 and 5, said voice communication link may be established using a Hands-Free Protocol, HFP, used for transmitting voice communication data rather than an A2DP protocol for streaming audio data.

For instance, the voice communication link is established between a smartphone, used as an audio gateway, and a hands free unit, used as the audio routing device. This allows establishing a one-to-many voice communication, e.g., using a voice communication link when a user receives a phone-call on his/her smartphone.

For instance, a user may want to broadcast a phone call to other devices, e.g. the driver of a car receiving a phone call on his smartphone may want to broadcast a phone call from his/her smartphone to a hands-free unit or to a headset which belongs to another passenger of the car in order to not be disturbed while driving.

According to one embodiment, a one-to-many voice communication can be established using an audio gateway, which may be aware of all the available voice route inputs and/or outputs related to a set of multimedia devices. Preferably, each route output is bidirectional.

According to one embodiment, an audio data routing device is configured for receiving one or more signals giving available voice route inputs and/or outputs. Preferably, said available voice routes match available SCO or enhanced SCO links, called eSCO links, at the moment of the communication, the number of said available links being smaller or equal to three.

Herein, a SCO link is a symmetrical point-to-point link between a master device and a slave device. A SCO link is typically used for sensitive data exchanges such as voice communication data exchange.

According to one embodiment, the HFP protocol is used to establish one or more SCO link(s) or radio link(s) used for voice data. This allows each device to transmit encoded voice data in a dedicated timeslot.

For instance, a passenger of a car who receives a phone call can connect to the gateway using his/her smartphone and receive a list of destination devices which are present in the car and to which the conversation of the phone call can be routed.

Once the audio data routing device receives at least one signal an giving available voice route input and/or output, it can send a signal to a hands-free unit, said signal comprising at least one route input and/or at least one route output selected by the user. As a follow-up, a bidirectional voice link is established between the audio data routing device and the hands-free unit. When a voice link is established, the hands-free unit sends the output voice data coming from the established voice link to the selected route output device. The voice communication can then be streamed to the hands-free unit via the established voice link.

Figure 6:
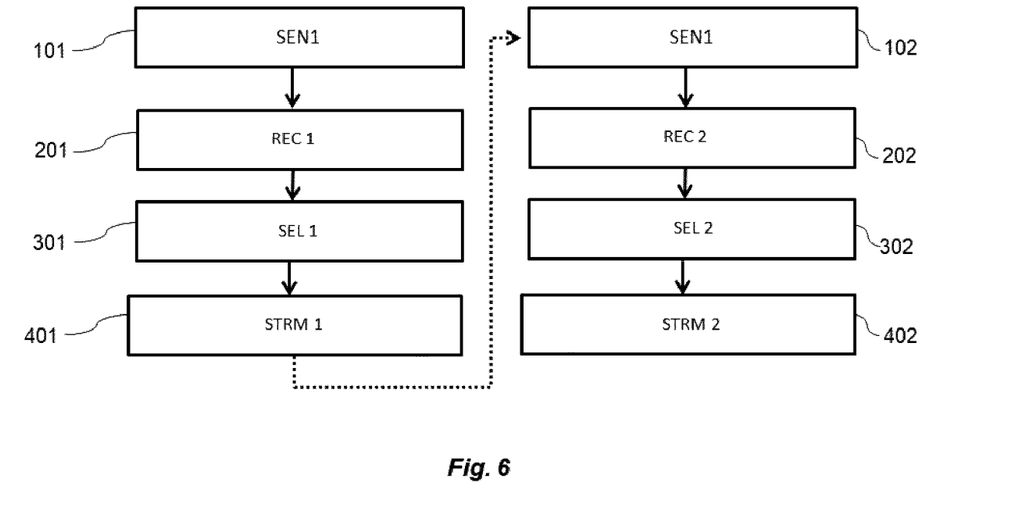
FIG. 6, illustrates a flowchart of a method according to embodiments of the disclosure.

Now with reference to FIG. 6, a simplified and non-limiting example of establishing a two-to-one voice communication is described. A voice communication is to be streamed by two audio transmitting devices to a plurality of audio transmitting devices, e.g. two speakers SPK1 and SPK2.

At a step 101, an audio data routing device M transmits a list indicating that the two speakers SPK1 and SPK2 are available.

For instance, such a list can be received by two smartphones S1 and S2. At a step 201, M receives a communication request RQ1 comprising an indication of the first speaker SPK1 in view of streaming content to said first speaker later on. At a step 301, and in response to RQ1, a Bluetooth audio stream is established between M and SPK1, while the second speaker SPK2 remains available for later use. Finally, M routes an audio stream to SPK1.

Following the steps 101, 201, 301 and 401, steps 102, 202, 302 and 402 similar to steps 101, 201, 301 and 401 are carried out. Said steps comprise: at a step 101, M transmits a list indicating that only the remaining speaker SPK2 is available; at a step 202, receiving at M a communication request RQ2 comprising an indication of the second speaker SPK2 in view of streaming content; at a step 302, and in response to RQ2, another Bluetooth audio stream is established between M and SPK2, and no speakers become available for later use; finally, M routes an audio stream to SPK2 at a step 402.

According to one embodiment, and in the case where the step 301 would be carried out before the step 302, M may indicate that the speaker SPK1 is already used and/or not available, and in such a case, that a second speaker SPK2 can be used for streaming.

According to one embodiment, and following the same steps 101, 201, 301, 401, 102, 202, 302 and 402, a voice communication can also be streamed by one audio transmitting device to a plurality of audio transmitting devices.

Figure 7:
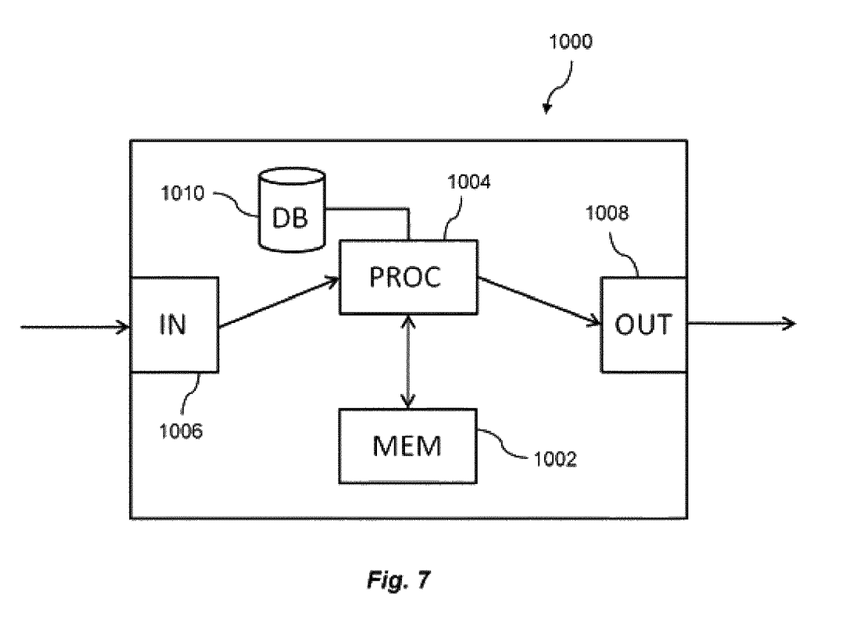
FIG. 7, illustrates the structure of a Bluetooth device according to embodiments of the disclosure.

FIG. 7 shows a device or system 1000 implementing a method according to one embodiment of the disclosure, and specifically, a method for managing a plurality of multimedia devices.

According to one embodiment, the system 1000 is a Bluetooth chip, for instance a Bluetooth chip BC comprised in an audio data routing device M. Said system 1000 can also be integrated in an electronic circuit or in any type electronic device.

The system 1000 can correspond to the audio data routing device itself.

According to one embodiment, the system 1000 comprises a storage space 1002, for example a memory MEM including a random access memory 1002. The storage space 1002 can also be a nonvolatile memory such as a ROM or a Flash memory, and can provide a recording medium, said recording medium being configured to store a computer program product.

The system 1000 further comprises a processing unit 1004 equipped for example with a processor PROC. The processing unit 1004 can be controlled by a program, such as a computer program implementing the managing method as described herein with reference to any of the previous figures. The processing unit 1004 can store instructions for performing the steps described with reference to FIG. 3, in particular steps 100 to 700.

The system 1000 may also comprise a database 1010 for storing data resulting from the method according to the invention, in particular for storing an information related to a communication request received from a Bluetooth slave device, to a selection of multimedia devices, to a communication link between said Bluetooth slave device and said multimedia devices, to a localization of a multimedia device, to a selection signal of the multimedia devices or to a response signal comprising an indication of a selected multimedia device.

The system 1000 comprises an input interface 1006, which is configured to acquire a communication request from a Bluetooth device. The system also comprises an output interface 1008, which is configured for establishing a communication link from a Bluetooth slave device to a multimedia device.

The output interface 1008 can be a communication module enabling the system 1000 to connect to a network, for exchanging data with other devices via said network. For example, the communication module can be a Wifi or Ethernet network interface, but includes preferably a Bluetooth communication module.

According to one embodiment, the Bluetooth chip is configured to implement any of the steps that have been described previously.

Specifically, the Bluetooth chip is at least configured for transmitting lists of audio transmitting devices, in particular available output devices, for receiving communication requests from audio transmitting devices, said communication request comprising indications available audio transmitting devices, for establishing Bluetooth audio streams in response to a communication request, in particular streams between an audio data routing device and an audio transmitting device and for routing audio streams from an audio transmitting device to one or more output devices.

Herein, expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

While there has been illustrated and described embodiments of the present invention, it will be understood by those skilled in the art that various other modifications may be made, and equivalents may be substituted, without departing from the true scope of the present invention. Additionally, many modifications may be made to adapt a particular situation to the teachings of embodiments of the present invention without departing from the scope of the invention.

For instance, any of the embodiments can be extended to non-audio applications such as a sharing of files such as photos, a sharing of text messages or text communication by chat, or video.

Furthermore, an embodiment of the present invention may not include all of the features described above. Therefore, it is intended that the present invention not be limited to the particular embodiments disclosed, but that the invention include all embodiments falling within the scope of the appended claims.

A person skilled in the art will readily appreciate that various parameters disclosed in the description may be modified and that various embodiments disclosed and/or claimed may be combined without departing from the scope of the invention.

It is stipulated that the reference signs in the claims do not limit the scope of the claims, but are merely inserted to enhance the legibility of the claims.

Further, the present subject disclosure comprises embodiments according to the following.

According to one embodiment, a communication request is based on a BLE GATT-based profile (or BLE GATT profile), namely, a Bluetooth Low Energy Generic Attribute profile, for carrying out the step of receiving said communication request.

The Generic Attribute Profile defines how two Bluetooth Low Energy or Bluetooth Dual Mode devices transfer data back and forth using GATT Services and GATT Characteristics. The Generic Attribute Profile is defined with respect to an Attribute Protocol, ATT, which is used to store Services, Characteristics and related data in a table using 16-bit identifiers corresponding to each entry of the table.

Herein, a GATT-based profile comprises a collection of GATT services and Characteristics which implement specific functions for communication between two Bluetooth Low Energy or Bluetooth Dual Mode devices, according to the GATT.

Figure 8:
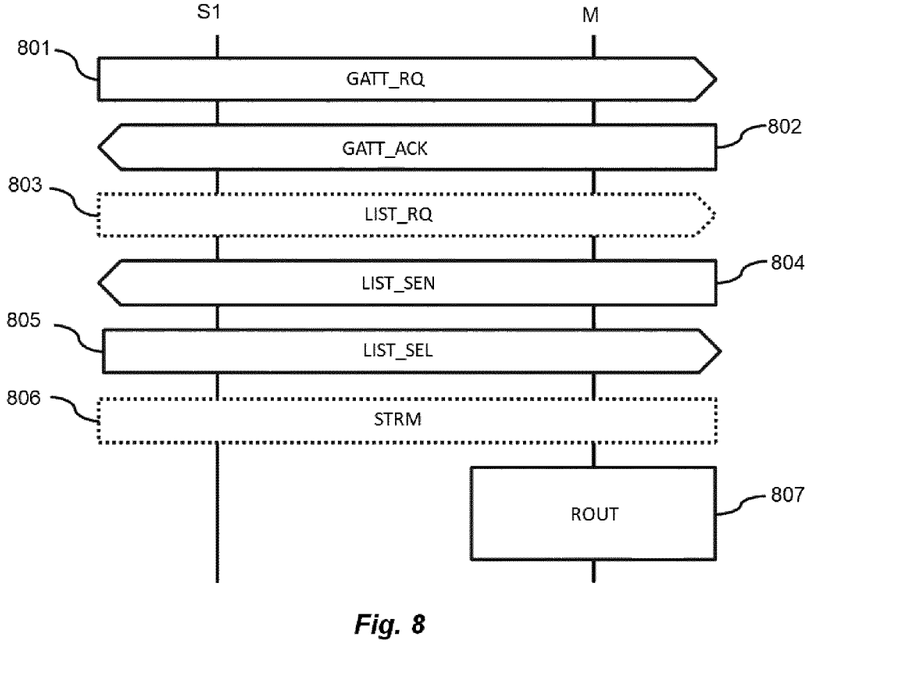
FIG. 8, illustrates a flowchart for retrieving a list of the audio transmitting devices according to embodiments of the disclosure.

FIG. 8 illustrates a flowchart for retrieving, with the Bluetooth enabled device connected to a GATT-based profile of the routing device, a list of the audio transmitting devices using a first function of the GATT-based profile.

According to one embodiment, a GATT connection request is transmitted during step 801 by one of the Bluetooth enabled devices S1 or S2 to the audio data routing device M (only the Bluetooth enabled device S1 is represented here).

According to one embodiment, the GATT connection request corresponds to a BLE connection or a BR/EDR connection.

Upon acceptation of the GATT connection request during step 802, the audio data routing device M transmits the list of available audio transmitting devices using a first function of the GATT-based profile.

The first function may involve an optional step 803 comprising requesting the list of available audio transmitting devices by the Bluetooth enabled device and a step 804 comprising transmitting the list of available audio transmitting devices to the Bluetooth enabled device.

According to one embodiment, a request to establish an audio communication with the selected destination device(s) using a second function of the GATT-based profile.

For instance, during step 805, the Bluetooth enabled device S1 or S2 may transmit a communication request by selecting one or multiple audio transmitting devices as destination devices using a second function of the GATT-based profile.

Optionally, and if not previously established, a Bluetooth audio stream between the Bluetooth enabled device S1 (or S2) and the audio data routing device M is established during step 806. Establishing said Bluetooth audio stream can be carried out by the audio data routing device M after selecting the destination devices or by the Bluetooth enabled device after accepting this selection.

The audio data routing device then routes the Bluetooth audio stream from the Bluetooth enabled device S1 and/or S2 to the selected destination devices during step 807.

According to one embodiment, steps 801 to 807 are carried out simultaneously to an ongoing existing Bluetooth audio stream between a Bluetooth enabled device S1 and/or S2 and the audio data routing device M.

In an example, a transmitted GATT procedure can be time multiplexed with an existing Bluetooth audio stream transmission. In another example, a GATT procedure can be handled on a BLE communication link between the Bluetooth enabled device S1 or S2 and the audio data routing device M, a Bluetooth audio stream being established using a BR/EDR link relying on the standard A2DP profile. Advantageously, this allows switching between different destination devices without interrupting or stopping the current Bluetooth audio stream.

Figure 9:
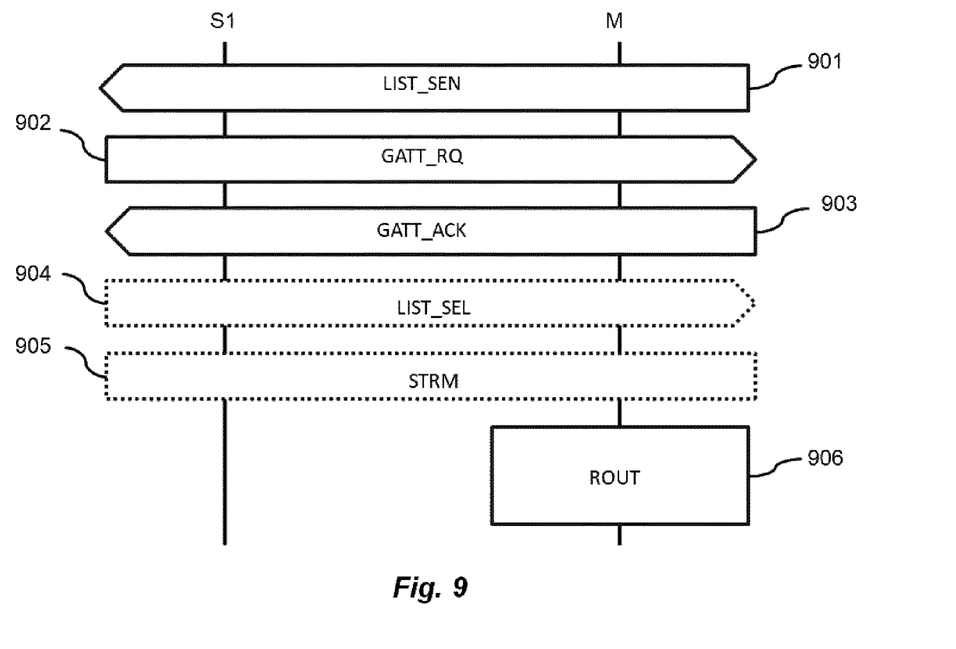
FIG. 9, illustrates a flowchart for transmitting a list of available audio transmitting devices from an audio data routing device to a Bluetooth enabled device according to embodiments of the disclosure.

FIG. 9 illustrates a flowchart for transmitting a list of available audio transmitting devices from an audio data routing device to a Bluetooth enabled device.

According to an embodiment, said transmitting is carried out prior to a GATT communication between the audio data routing device and the Bluetooth enabled device.

During step 901, the list of available audio transmitting devices is sent using BLE advertisements, which are received by the Bluetooth enabled device S1 or S2 while said Bluetooth enabled device scanning for such BLE advertisements. The Bluetooth enabled device may then transmit a request to establish an audio communication with the selected destination device(s) using a second function of the GATT-based profile.

According to an embodiment, the Bluetooth enabled device S1 or S2 sends a GATT connection request during step 902. The GATT connection request is received by the audio data routing device during step 903. During step 904, the Bluetooth enabled device S1 or S2 selects one or multiple audio transmitting devices as corresponding destination device(s). Such a selection may be comprised in the GATT connection request of step 902.

According to an embodiment, a Bluetooth audio stream is established between the Bluetooth enabled device S1 or S2 and the audio data routing device M during step 905, if not previously established. For instance, the Bluetooth audio stream is established by the audio data routing M device after selecting the destination devices or by the Bluetooth enabled device S1 (or S2) after receiving (and/or accepting) this selection.

According to an embodiment, the audio data routing device M routes the Bluetooth audio stream from the Bluetooth enabled devices S1 and/or S2 to the selected destination devices during step 906.

The invention claimed is:

1. A method for managing a routing of audio data, the method being performed by an audio data routing device, the method comprising the steps of:
   retrieving a list of audio transmitting devices using a first function of a Bluetooth Low Energy (BLE) Generic Attribute (GATT) profile, and
   transmitting, in a Bluetooth network, the list of audio transmitting devices,
   receiving a communication request from a Bluetooth enabled device,
   in response to said communication request, establishing a communication link with the Bluetooth enabled device, and
   managing the audio data routing between the Bluetooth enabled device and a selected audio transmitting device from the list of audio transmitting devices, wherein:
   at least one of transmitting the list of audio transmitting devices or receiving the communication request is carried out using the BLE GATT profile.

2. The method according to claim 1, wherein receiving the communication request is carried out using a second function of the BLE GATT profile.

3. The method according to claim 2, wherein the communication request transmitted from the Bluetooth enabled device includes selecting at least one audio transmitting device as a destination device.

4. The method according to claim 1, wherein the audio data routing between the Bluetooth enabled device and the selected audio data transmitting device is carried out with a Bluetooth chip of the audio data routing device.

5. The method according to claim 1, wherein said communication link is established between an audio routing device and one Bluetooth enabled device, said communication link being in a group comprising: a unidirectional point to point link and a bidirectional point to point link.

6. The method according to claim 1, wherein said communication link is established between an audio routing device and a plurality of Bluetooth enabled devices, said communication link being in a group comprising: a unidirectional multipoint to point link and a bidirectional multipoint to point link.

7. The method according to claim 1, further comprising implementing an extended Bluetooth audio profile that supports multiple simultaneous links between the audio transmitting devices and the Bluetooth enabled device.

8. The method according to claim 1, wherein the audio data comprises a Bluetooth signal being in a group comprising: an audio stream signal and a voice communication stream signal.

9. The method according to claim 1, wherein the audio data routing from the Bluetooth enabled device to the audio transmitting devices is carried out by a direct communication link or by an indirect communication path.

10. An audio data routing device configured to:
retrieve a list of audio transmitting devices using a first function of a Bluetooth Low Energy (BLE) Generic Attribute (GATT) profile,
transmit, in a Bluetooth network, the list of audio transmitting devices,
receive a communication request from a Bluetooth enabled device,
in response to said communication request, establish a communication link with the Bluetooth enabled device, and
manage audio data routing between the Bluetooth enabled device and a selected audio transmitting device from the list of audio transmitting devices.

11. The audio data routing device according to claim 10, comprising a Bluetooth chip, said Bluetooth chip being configured to carry out:
the transmitting in the Bluetooth network, of the list of available audio transmitting devices,
the receiving of the communication request from the Bluetooth enabled device,
in response to said communication request, the establishing of the communication link with the Bluetooth enabled device, and/or the managing of the audio data routing between the Bluetooth enabled device and the selected audio transmitting device from the list of available audio transmitting devices.

12. A vehicle infotainment system for managing routing of audio data, the vehicle infotainment system comprising:
audio transmitting devices,
a Bluetooth enabled device, and
an audio data routing device configured to:
retrieve a list of audio transmitting devices using a first function of a Bluetooth Low Energy (BLE) Generic Attribute (GATT) profile, and
transmit, in a Bluetooth network, the list of audio transmitting devices,
receive a communication request from a Bluetooth enabled device,
in response to said communication request, establish a communication link with the Bluetooth enabled device, and
manage the audio data routing between the Bluetooth enabled device and a selected audio transmitting device from the list of audio transmitting devices.

13. The vehicle infotainment system according to claim 12, wherein at least one audio transmitting device comprises a directional speaker or a microphone.

14. The vehicle infotainment system according to claim 12, wherein at least one Bluetooth enabled device is in a group comprising: a smartphone, a Bluetooth speaker, a Bluetooth headset, a computer, a tablet, and a video game console.

* * * * *